United States Patent
Lehtinen et al.

(10) Patent No.: US 6,172,673 B1
(45) Date of Patent: Jan. 9, 2001

(54) MULTIMEDIA TERMINAL AND METHOD FOR REALIZING MULTIMEDIA RECEPTION

(75) Inventors: Risto Lehtinen, Helsinki; Harri Okkonen; Pekka Heinonen, both of Espoo; Ari Ikonen, Raisio, all of (FI)

(73) Assignee: Nokia Mobile Phones, Ltd., Espoo (FI)

( * ) Notice: Under 35 U.S.C. 154(b), the term of this patent shall be extended for 0 days.

(21) Appl. No.: 08/837,778

(22) Filed: Apr. 22, 1997

(30) Foreign Application Priority Data

Apr. 23, 1996 (FI) .......................................... 961750

(51) Int. Cl.[7] .............................. H04N 7/10; H04N 7/14; H04H 1/14; H04H 1/00
(52) U.S. Cl. .............................. 345/327; 348/13; 348/12; 455/3.1; 455/5.1; 455/6.1
(58) Field of Search ............................... 345/327; 348/13, 348/12, 10, 6, 7; 455/6.3, 6.2, 5.1, 4.2, 3.1, 422, 426, 445, 31.3, 31.2; H04N 7/10, 7/14; H04H 1/14, 1/00, 1/02

(56) References Cited

U.S. PATENT DOCUMENTS

| | | | |
|---|---|---|---|
| 5,177,604 | | 1/1993 | Martinez ................................. 358/86 |
| 5,181,107 | * | 1/1993 | Rhoades ................................. 348/13 |
| 5,195,092 | | 3/1993 | Wilson et al. ........................ 370/94.2 |
| 5,220,420 | * | 6/1993 | Hearty et al. ........................... 348/12 |
| 5,586,121 | * | 12/1996 | Moura et al. ........................... 348/12 |
| 5,635,980 | * | 6/1997 | Lin et al. ................................. 348/13 |
| 5,642,155 | * | 6/1997 | Cheng ..................................... 348/13 |
| 5,673,430 | * | 9/1997 | Story ...................................... 348/13 |
| 5,781,245 | * | 7/1998 | Van Der Weij et al. ............... 348/13 |

FOREIGN PATENT DOCUMENTS

| | | |
|---|---|---|
| 44 22 015 C1 | 8/1995 | (DE) . |
| 952880 | 6/1995 | (FI) . |
| 955504 | 11/1995 | (FI) . |
| 2 294 132 | 4/1996 | (GB) . |

OTHER PUBLICATIONS

Balakrishnan, M. et al., "Digital video and the national information infrastructure" Philips Journal Of Research, vol. 50, No. 1, Jan. 1, 1996, p. 105–129.

Mitterhummer, I., et al. "Datenrundfunk Mit Dab", Funkschau, vol. 67, No. 22, Oct. 13, 1995, p. 45–48.

Akiwumi–Assani, O., et al., "Multi–media terminal architecture", Philips Journal Of Research, vol. 50, No. 1, Jan. 1, 1996, p. 169–184.

* cited by examiner

Primary Examiner—Nathan J. Flynn
Assistant Examiner—Vivek Srivastava
(74) Attorney, Agent, or Firm—Perman & Green, LLP

(57) ABSTRACT

Equipment (2, 15) is used for the reception of multimedia presentations and for their playback to the user, said equipment comprising a storage and presentation apparatus such as a computer (16) or television (3) and a terminal of a bidirectional communications system such as a mobile phone (4) or cordless phone (19). The multimedia information is loaded dynamically, and keys needed to descramble scrambled transmissions are delivered to the user via a bidirectional communications system. In the terminal equipment a local agent (14) which uses only a little of system capacity takes care of information loading and checks the available resource. Bidirectional communications can also be used for making payments to the producer and/or distributor of the multimedia service in the form of operations similar to telebank services.

28 Claims, 4 Drawing Sheets

MULTIMEDIA TERMINAL AND METHOD FOR REALIZING MULTIMEDIA RECEPTION

Figure 1:
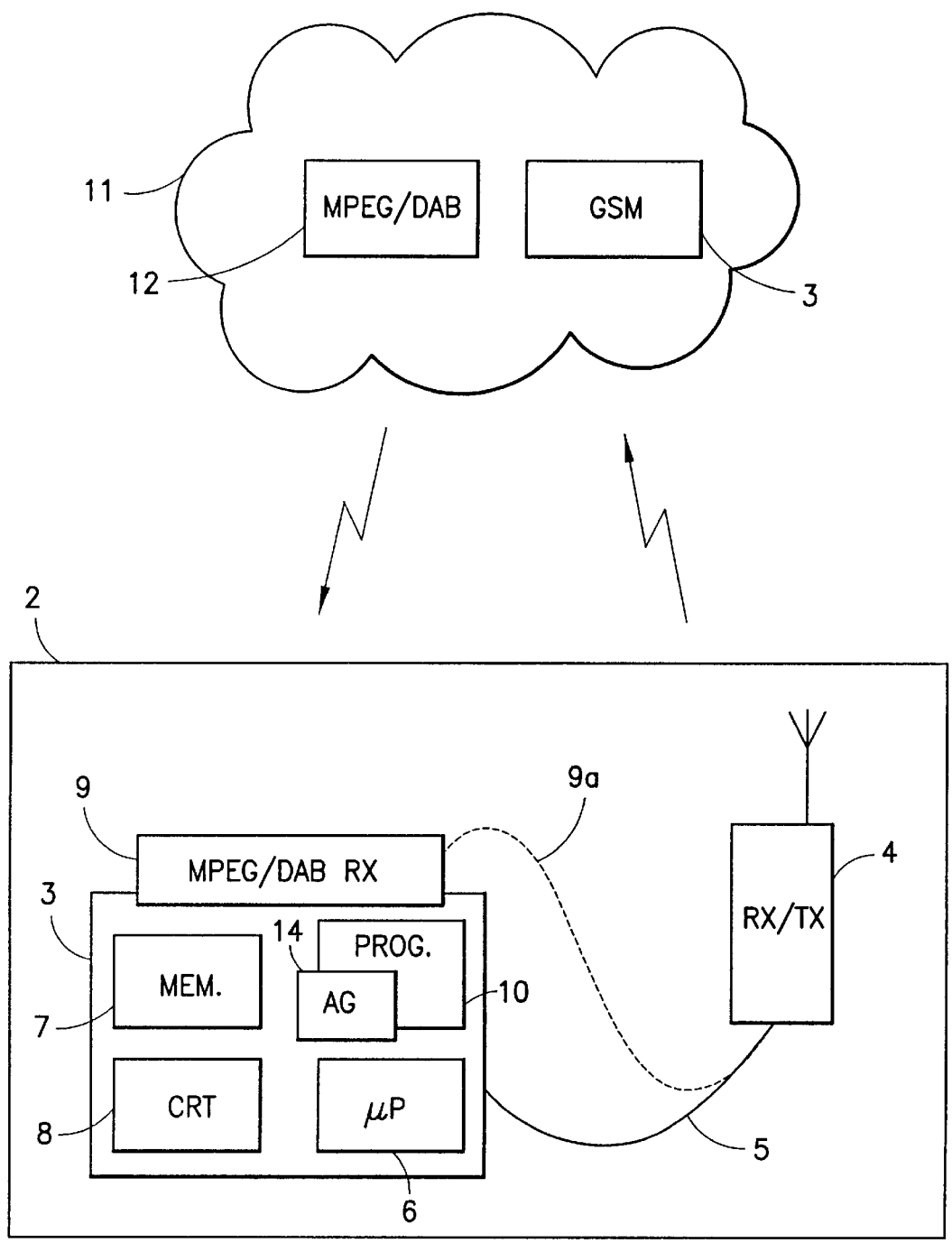

The invention relates in general to consumer-oriented multimedia technology and in particular to a method and equipment by means of which a consumer can have access to a wide supply of multimedia and equipment that can be applied in a versatile manner to various telecommunications needs.

Multimedia, or synchronised playback of simultaneous audiovisual objects, has gained wide popularity as powerful personal computers have become more and more accessible to consumers. The most widely used form of multimedia is a program which is distributed on a computer mass memory medium such as CD-ROM and which, when executed on a computer, reproduces by means of a display unit and loudspeakers data in the form of images, text and sound. Multimedia not only performs simultaneously playback but is often also interactive in nature, ie. the user can affect the program flow through his choices.

Handling of multimedia programs on the abstract level is dealt with in the ISO/LEC standard 13522 which currently comprises 5 parts and which in this document will be called the MHEG standard (Multimedia Hypermedia Information Coding Experts Group) and in which a multimedia program is defined as an entity consisting of so-called objects. Said objects are class objects in that they are categorised into object classes according to a certain syntax, and the objects in a given class comply with the specifications of that class. The object classes include e.g. links, action objects, composition objects, content objects and container objects. Certain objects may be temporally continuous and they are called streams. Furthermore, objects may be multiplexed so that a multiplexed object consists of two or more streams which are called component streams. These, in turn, may also be multiplexed and thus contain more streams.

In order to produce a multimedia presentation using objects according to the MHEG standard a special means is needed which is capable of handling, or interpreting, objects, arranging their mutual relations in the correct manner and controlling their presentation to the user. That special means is known as the MHEG engine. Usually it is realised in the form of program code and its operation at the general level is defined in the MHEG standard.

As systems are improved and become more widely used, multimedia programs will also be broadcast through radio transmission stations, satellites and/or cable TV systems in the same way as radio and television programs today. Broadcasting means electrical distribution of programs from a central place of transmission to a very large group of users in a wide geographic area who can receive transmitted programs according to their choice and who can be obliged, according to the choice of the broadcast, to pay a certain fee for the reception. Up till now, few reasonably priced multimedia terminals intended for consumer use have been proposed that could be applied for efficient reception of such transmissions.

Several efficient methods are known for unidirectional broadcast-type distribution and we will use here as an example a new digital broadcasting system called Digital Audio Broadcasting, or DAB. The DAB system specifications are found in standard ETS 300 401 drawn up by the European Broadcasting Union (EBU) and the European Telecommunications Standards Institute (ETSI). Application of the DAB system in the transmission of multimedia objects is discussed in Finnish patent applications 952880 ("Multimediaobjektien välitys digitaalisessa tiedonsiirtojärjestelmässä"), 955504 ("Multimediaohjelman palvelukomponenttien koodaus digitaalisessa radiokanavassa"), and 960418 ("Digitaalisten esitysobjektien salaus lähetyksessä ja tallennuksessa") which have the same applicant as this application. These applications show that a modern digital broadcasting system can be used for transmitting objects in file or stream format from a sender to a receiver. The applications, however, do not disclose a multimedia receiver proper.

A multimedia receiver should provide the technical implementation by means of which the user is able to select programs and services of his choice from a supply which can be very large. In the case of interactive multimedia the receiving equipment should also provide means for delivering messages indicating user selections to the transmitting station or another point in the transmission system where the selections have a desired effect on the contents of the program received by the user. Thus, communications related to broadcast-type multimedia has to be bidirectional at least to a limited extend ("limited" because the amount of upstream information, ie. information from user to system, is likely to be a fraction of the amount of downstream information).

From the point of view of those producing and distributing multimedia programs it is important that the user pays an agreed remuneration for the programs and services he uses and that intentional unauthorized reception is prevented in some way. In practice, programs are usually transmitted in scrambled form and the user is delivered against payment a descrambling device and/or descrambling key, the latter being a certain pseudo-random character sequence. Equipment designed for multimedia reception should make scrambling, descrambling and invoicing procedures easy to carry out. In addition, multimedia receivers conform to the same rules as other technical products aimed at the consumer market: the more versatile and useful the users consider the device and the more advantageous the selling prices, the more people will potentially buy the product.

An object of this invention is to provide a method and equipment that meet the requirements of multimedia reception and receiver as described above.

The objects of the invention are achieved by combining a terminal of a bidirectional communications network and a terminal or computer equipment of a high-capacity unidirectional transmission network and using their combined characteristics in a manner that is dynamically changing in accordance with operating conditions and requirements.

Equipment according to the invention comprising a first apparatus and a second apparatus is characterised in that it comprises in said first apparatus storage means for the temporary storage of multimedia information to be presented, and an agent for controlling dynamic reception and storage of multimedia information and for conveying information related to the use of the multimedia information to a communications system via said second apparatus.

The invention is also directed to an apparatus intended to be used as the first apparatus in the multimedia terminal equipment. The apparatus according to the invention is characterised in that it comprises storage means for the temporary storage of multimedia information and an agent for controlling dynamic reception and storage of multimedia information and for conveying information related to the use of the multimedia information to a communications system.

The invention is further directed to a method for the selective reception of multimedia presentations from a transmission system and for presenting said presentations to the user. The method according to the invention is characterised in that it comprises stages wherein in response to a user selection it is examined whether multimedia information required by the user selection and related to a certain multimedia presentation is locally stored, multimedia information required by the user selection and related to a certain multimedia presentation which is not locally stored is loaded from the transmission system and stored locally, and multimedia information required by the user selection and related to a certain multimedia presentation is removed from the local storage as it is no more needed in order to present the multimedia presentation to the user.

This invention shows that a working multimedia receiver meeting the requirements mentioned above can be produced by combining a broadcast-type receiver with a terminal of a bidirectional communications network, which may be e.g. a two-way paging device, mobile phone in a cellular network or a conventional phone connected to a digital switching centre. Said broadcast-type receiver is preferably a modern TV receiver in which the invention calls for only minor changes or no changes at all. To keep the required storage capacity down the equipment does not store in one storage medium the whole multimedia program to be presented, unlike in known CD-ROM implementations, but the required program elements are dynamically picked from the transmission stream and presented without storing or stored locally only for the time that they are needed. Picking and presenting the elements includes their possible descrambling.

One advantageous feature of the system is a local agent, ie. a loading and checking program which requires very little storage space and which on the user's request checks whether the available hardware resources meet the requirements and starts the dynamic loading and execution of the program proper. Said terminal of a bidirectional system is used for conveying selection data controlling the loading from the user to the transmission station or another part of the transmission network. In one advantageous embodiment of the invention the terminal of a birectional system also functions as a transfer medium of downstream multimedia information so that said broadcast-type receiver is only a presentation medium. The same terminal of a bidirectional system can be used for transferring invoicing information between the user and the service provider as well as for delivering to the user the authorisations and keys needed for the descrambling.

Figure 2:
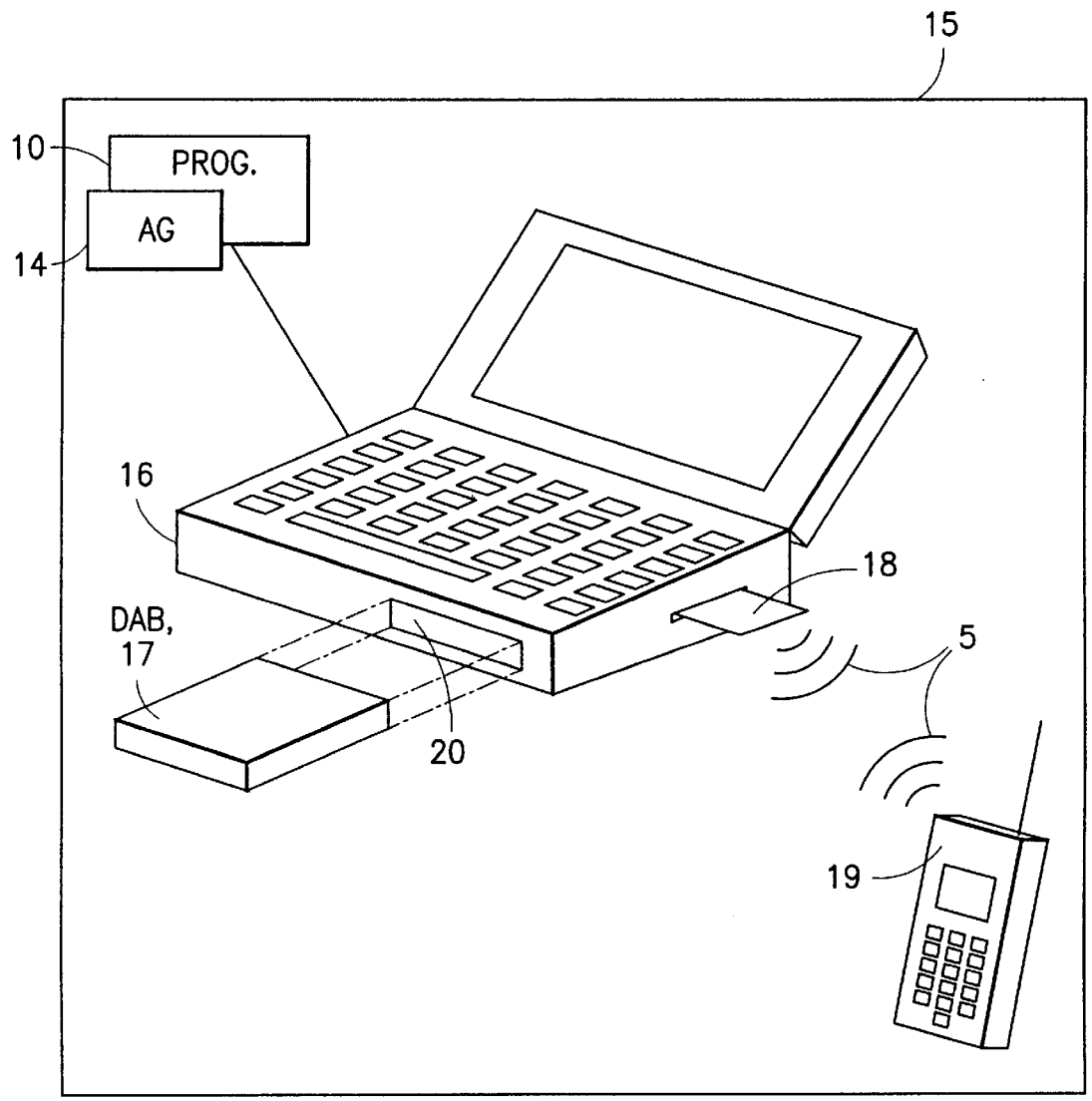
Figure 3:
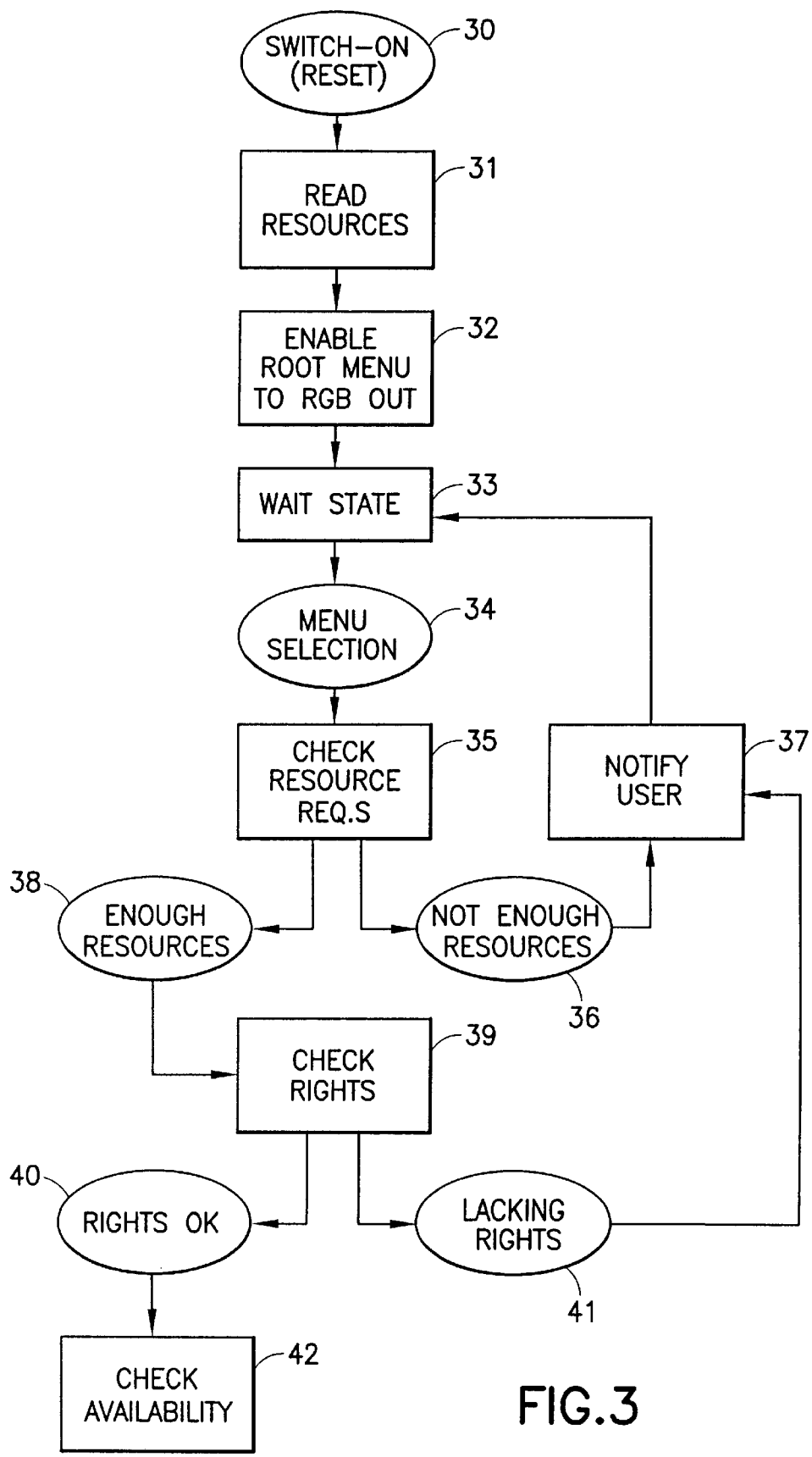
Figure 4:
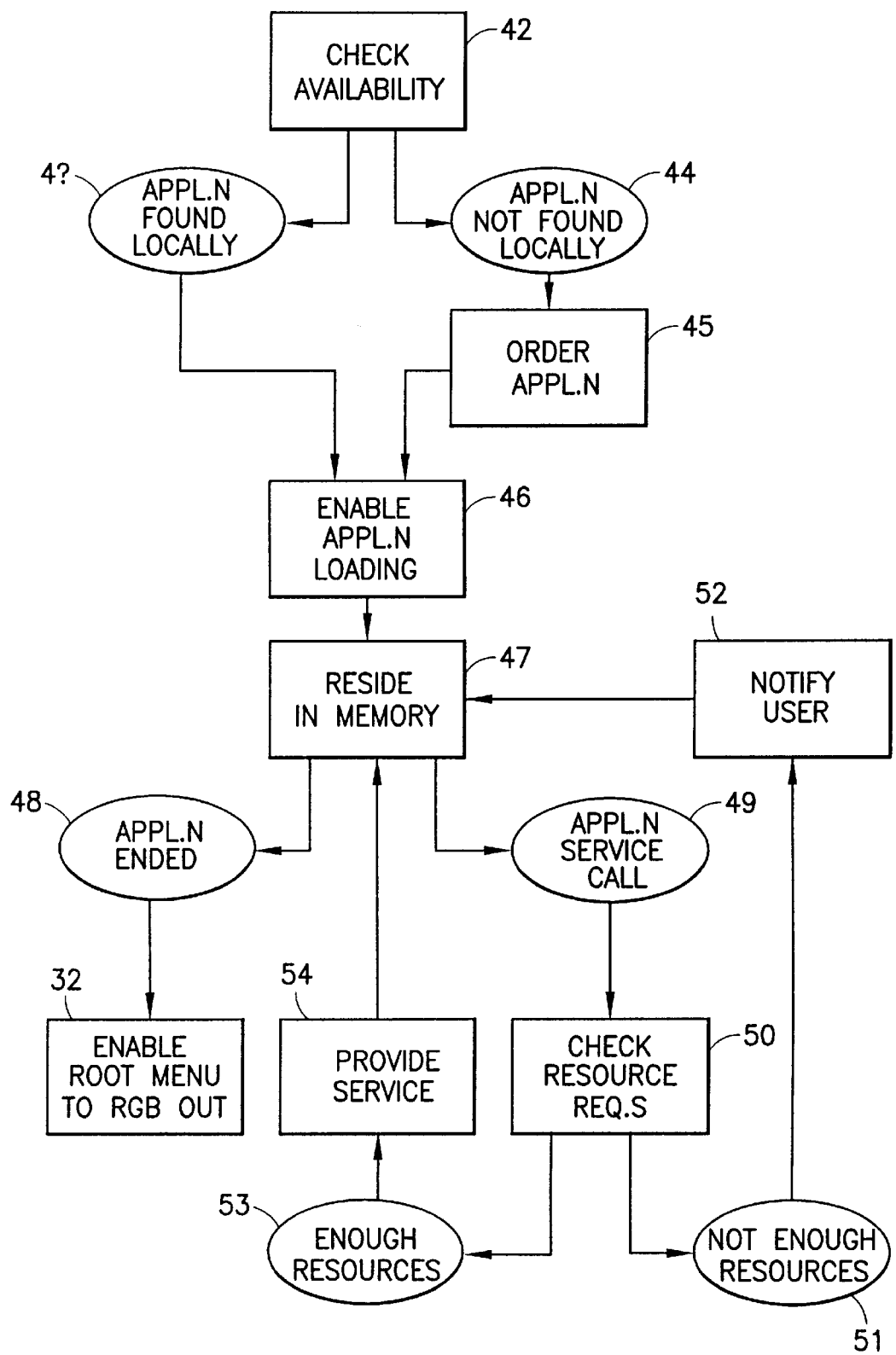

The invention is described in more detail with reference to the preferred embodiments presented by way of example and to the attached drawing wherein FIG. 1 shows a system according to a preferred embodiment of the invention, FIG. 2 shows a hardware configuration according to a second preferred embodiment of the invention, FIG. 3 shows a first part of the state diagram of a preferred agent, and FIG. 4 shows a second part of the state diagram of a preferred agent.

Like elements in the drawing are denoted by like reference designators.

FIG. 1 shows a multimedia terminal equipment 2 for consumer use comprising a receiver 3 of a unidirectional broadcasting system and a terminal 4 of a bidirectional communications system, the two being linked by a local communications link 5. The receiver 3 may be, for example, a modern TV receiver comprising a microprocessor 6 controlling its operation, storage 7 in the form of semiconductor memory and/or mass memory medium, and a cathode ray tube (CRT) or flat-panel display, such as electroluminance or liquid crystal display, as a display unit 8. In the embodiment depicted in FIG. 1, the receiver 3 also comprises an ordinary reception part 9 to receive TV transmissions which can be conveyed to the user via cable or through electromagnetic radiation. The microprocessor 6 controls the operation of the receiver according to an application program 10 so that it can be said, as is customary in the art, that "the application program performs" certain operations.

The reception part 9 may also be a versatile multireceiver comprising means for receiving analog and digital signals via a cable, satellite or wireless or wired local area network (LAN) or metropolitan area network (MAN). The terminal 4 of a bidirectional system can also serve as a downstream transmission channel for the transmission of program components if the data transfer rate via it is sufficient. Then the reception part 9 comprises as one reception alternative direct input 9a from the terminal 4.

The terminal 4 of a bidirectional communications system may be, for example, a mobile phone, such as GSM phone, of a digital cellular network or a two-way paging device which can exchange simple messages between a nearby radio base station (not shown in the drawing). The local communications link 5 may be, for example, a wired connection (such as an RS-232 connection), an infrared link or a low-power radio link. A person skilled in the art is familiar with the means for establishing such a link e.g. from equipment entities constituting a digital mobile phone and portable computer.

FIG. 1 also shows a communications network 11 which can be a very complex and varied entity comprising several separate systems interconnected through repeaters and protocol converters (not shown in the drawing). In the case of FIG. 1, the communications network 11 comprises at least an element 12 producing audiovisual transmissions in the MPEG (Motion Pictures Experts Group) format and broadcast transmissions in the DAB format and a digital cellular radio system 13. It may also comprise parts of broad Internet-type networks designed for inter-computer communications, as well as parts of wired telephone networks and local cable distribution networks and wired or wireless local area networks for computers. In addition, the communications network 11 may complete elements that produce and distribute other than the aforementioned MPEG- and DAB-type TV and/or radio transmissions using wide-range transmission and link stations that can be situated on the ground or in satellites.

In the embodiment depicted in FIG. 1 the capacity of the storage 7 in the receiver 3 is limited to, say, a few hundred megabytes to keep the manufacturing costs related to the storage as low as possible. A multimedia program transmitted through the communications network 11 usually comprises large picture and sound files which call for temporary storage in the terminal equipment. In addition, the presentation of a multimedia program to the user places certain minimum requirements on the playback characteristics of the terminal equipment 2; for example, the resolution of the display 8 and the sound reproduction capabilities of the loudspeakers (not shown in the drawing) possibly connected to the system generally have to exceed a certain minimum level. It is frustrating for the user if an already-started program is interrupted or does not meet the requirements because the hardware resources are inadequate. To that end the receiver 3 has in accordance with the embodiments shown in FIG. 1 an agent 14 which, hierarchically speaking, operates under an application program 10. It is preferably realised as a software process and its task is to verify that the resources of the terminal equipment are adequate for executing a given multimedia program.

Operation of the system according to FIG. 1 for receiving and using a multimedia program is described below by way of example, referring to FIGS. 3 and 4. Rectangular blocks in the figures represent states or functions of the agent and elliptic blocks represent transition conditions or events that cause a transition from a state or function to another. Switch-on 30 and starting of the agent cause a chain of events in which the agent checks according to block 31 which system resources (processor(s), peripherals, memory, etc.) are available. In block 32 the agent enables the start menu to be brought to the display in the form of a normal RGB (Red Green Blue) signal whereafter the agent enters the wait state 33. The start menu may include e.g. a list of multimedia and application programs available through the communications network. The user indicates his choice by issuing a certain command by means of a remote control device, for example. When the user makes a menu selection 34 the agent checks in block 35 which system resources the program (a multimedia program, for instance) requires. If the agent detects according to block 36 that the available system resources are insufficient, it notifies 37 the user, possibly recommending at the same time that the user should make more system resources available by terminating other simultaneously executed programs, and returns to the wait state 33.

If the agent detects according to block 38 that there are enough system resources free and available, it next checks according to block 39 whether the user has the necessary rights to use the program. A negative result 41 results in a notice 37 to the user and a return to the wait state 33. If the user rights are sufficient according to block 40, the agent checks in block 42 whether the program components required by the program in question have already been stored in the terminal equipment's memory. FIG. 4 shows how the procedure continues from state 42 on. If a suitable start program is found in the storage, as shown in block 43, which may be e.g. a MHEG engine needed for executing a certain multimedia program in the MHEG format, the agent enables loading of the start program in block 46, hands over the control of the system to the start program and stays in the background, residing in memory, according to block 47. If the agent detects in block 42 according to block 44 that the multimedia program selected by the user has to be loaded from the network, it makes an order in block 45 using the included terminal of a two-way communications system, whereby operation continues in block 46 after the start program received from the network has been loaded.

During the execution of an interactive program, say, a multimedia program, a situation may arise wherein a user's choice or command requires the execution of a new service which is not included in the multimedia program. The multimedia program may involve e.g. the filling out of a pools coupon so that the user is given a chance to select a line on the coupon using a random number generator which is not included in the pools coupon filling program. Block 49 represents in a general manner a service call which in a case like this is sent to the agent by the active multimedia program. The agent checks in block 50 whether there are sufficient system resources for the new service. If, according to block 51, there are not enough resources, the agent notifies 52 the user and returns to state 47 in which it was before the service call 49. If, according to block 53, there are enough resources, the agent executes the service in block 54 and then returns to state 47. The execution of the service may call for complex action (e.g. obtaining program components via the communications network) so that block 54 may even include all the functions according to blocks 39, 40, 41, 42, 43, 44, 45 and 46 as described above. When the multimedia programs is ended according to block 48, the agent returns to state 32 and via it to the wait state 33 as shown in FIG. 3.

According to an embodiment the system may also perform preselection on the basis of hardware requirements so that the start menu shows to the user only programs for the reception and playback of which the equipment is capable. Several multimedia programs may be simultaneously active if there are enough hardware resources. One agent may deal with multiple multimedia programs or each program may have an agent of its own.

If the reception part 9 is capable of receiving information from several different systems as described above, it is preferable from the user's standpoint that the most advantageous transmission system and channel are chosen each time to load a given program or program component. Transmission costs to the user are often proportional to the capacity of the transmission link wherefore a very fast transmission mode (such as DAB reception) should only be used for loading large and/or continuous picture and sound objects. Additionally, the time of day may have an effect on the costs as the use of telephone connections, for example, is more expensive at daytime than in the evenings and at night. It pays to load simple objects, such as text messages, through, say, a paging service or digital cellular radio network so that the short message service (SMS) according to known specifications can be used for their transmission, if necessary.

The most advantageous channel can be selected by the user (online selection or selection made in advance) or by the agent or by an application program. At the beginning of the loading the agent may inquire by means of a bidirectional terminal 4 for the "price of the day" of the various channels and select the most advantageous channel on the basis of the offers made. In addition to the cost factor the decision may be based on the anticipated quality of the connection as, for example, on the fringes of a cellular radio system poor reception can considerably impede the loading. Other possible factors include the user's registered rights and preference choices made by the user.

Objects and program components associated with a multimedia program are advantageously sent scrambled so that the distributor is able to control the reception and use of the programs and how the fees are paid. Then the terminal equipment 2 must be in possession of a descrambling key. There are several possible ways of delivering the key to the terminal equipment. If the equipment includes a smart card reader the user may go to the representative of the distributor and make the necessary payment and load the necessary keys into this smart card. When inserted in the smart card reader in the equipment the smart card delivers the keys to a descrambling circuit in the equipment. A second alternative for delivering the key to the user's equipment is to send it via a bidirectional communications system to the terminal 4 and therefrom, in necessary, via a communications link 5 to the receiver 3. If said bidirectional communications system has sufficient identification and verification functions to prevent forgery and misuse of messages related to the payments it can also be used for transferring the payments by the user in the same manner as other known telebank services are carried out. Then the terminal 4 includes an identification code or other information which identifies the user for the communications system. A known identification and code method is, for example, the method based on SIM (Subscriber Identity Module) cards in the GSM system.

In the equipment 2, tasks related to the use of the programs and calculation of the costs arising from the use and to the storage of payment information are preferably left to the agent. It can store the data in memory 7 or in the smart card if the equipment employs one. Preferred methods for realising the practical arrangements related to invoicing are disclosed in the Finnish patent application no. 960418 "Digitaalisten esitysobjektien salaus lähetyksessä ja tallennuksessa", which has the same applicant as this application. The invoicing may be based on a one-time payment, pay-per-load system or on time charging. In the first of these alternatives the user makes to the service provider or some other party collecting the fees a lump payment whereafter he has a limitless right to load and use a certain program. In the pay-per-load system the user pays for each time that he connects to the network and loads a certain program from the network into his own equipment. The number of actual uses of a loaded and stored program has an effect on the payment only in the third alternative wherein the payment is based on the time that the program has been actively used by the user. Naturally, the system of invoicing may also be based on the combination of the alternatives described here. A basis of invoicing may also be the use of the communication connection for which the payment is then likely to go to the operator providing the connection and not to the producer of the multimedia program. Of course, the operator may remunerate the producer of the multimedia program.

Operation of the system also includes the ending of the user of a given multimedia program. When the user indicates e.g. by means of a remote control device that he wants to stop using a given multimedia program, the agent or an application closes the transmission and presentation channels reserved by the program and, if necessary, removes from storage those data that are no longer needed and informs the service provider, by means of the terminal of the bidirectional communications system, that the user has stopped using the program. That last piece of information can also be used for determining the basis of invoicing.

FIG. 2 shows a hardware configuration 15 according to a second embodiment of the invention. It comprises a portable computer 16, a small-sized DAB receiver 17 and a PCMCIA card 18 (Personal Computer Memory Card International Association) connected to said computer, and a digital telephone apparatus, preferably a GSM or DECT phone 19 (Digital European Cordless Telephone) which communicates locally with said PCMCIA card. The computer 16 has an application program 10 and agent 14 like the TV receiver discussed above. The DAB receiver 17 is preferably built such that it can be connected to the computer through a multi-purpose extension port 20. Many modern computers include such an extension port to which the user can connect mass storage media or other peripheral devices according to his needs. In the embodiment illustrated the connection 5 between the PCMCIA card 18 and the phone 19 comprises an infrared link.

Compared to the embodiment described above with reference to FIG. 1 the embodiment of FIG. 2 has the advantage that it is lighter and smaller and therefore easier to move from one place to another. As regards the simplest of multimedia programs, even the DAB receiver 17 could be left out of the embodiment of FIG. 2, in which case all communications between the equipment and the "outside world" would be carried out through the phone 19 (the same naturally applies to the embodiment of FIG. 1). But as the DAB system offers considerably faster transmission rates than current cordless telephone systems or cellular radio systems, it is most likely necessary to use it or some other corresponding broadcasting system if e.g. a perfect moving image or multi-channel hifi sound is to be transmitted to the user.

It is obvious to a person skilled in the art that the embodiments described above are exemplary in that their components and functionally equivalent devices can be combined in many ways and in various quantities so as to compile a multimedia equipment according to the invention. The example of usage described above does not limit the invention because the nature and order of the actions can vary within the scope of the invention defined by the claims set forth below. An obvious modification of the invention is to use a bidirectional paging device to unlock a locking code in a hotel TV system. A bidirectional paging device communicates with a hotel TV and delivers to it the keys which are needed for viewing programs on the hotel TV. To get the keys the bidirectional paging device delivers the user's invoicing information via a communications system to a recipient that controls the use of the hotel TV system for the reception and playback of programs that require payment.

The invention is clearly an improvement from the prior art because according to the invention a multimedia terminal equipment can be compiled using components which also are useful as separate devices. The user is able to use the mobile phone, cordless phone, TV receiver and portable computer included in the illustrative embodiments in their usual functions. In the preferred embodiment, the operation according to the invention as part of a multimedia terminal equipment only requires certain re-programming of the devices, which is a procedure known to one skilled in the art. For example, most modern TV sets have a so-called service interface through which the program code controlling the operation of the TV can be modified. Especially in so-called hotel TV systems the software modifications can be realised even remotely controlled within a certain cable distribution system.

What is claimed is:

1. Equipment for selective reception of multimedia transmissions from a telecommunications system and for the presentation of multimedia information in said multimedia transmission to a user, comprising:

a first apparatus having means for receiving from said telecommunications system audiovisual high-capacity unidirectional multimedia transmissions containing multimedia information, and means for presenting said multimedia information to a user, and a second apparatus having a bidirectional communications terminal comprising a wireless communication device for delivering information related to the use of said multimedia information to said telecommunications system, said bidirectional communications terminal transmitting said information related to the use of said multimedia information at a slower transmission rate than the rate of said unidirectional multimedia transmissions, and wherein said first apparatus and said second apparatus are linked by a local wireless communication link and said first apparatus further comprises:

storage means for the temporary storage of received multimedia information to be presented to a user, and an agent for controlling dynamic reception and storage of received multimedia information and for controlling the delivering of said information related to the use of multimedia information to said telecommunications system via said second apparatus.

2. The equipment of claim 1, wherein said first apparatus comprises a receiver for receiving multimedia information in the form of a broadcast transmission.

3. The equipment of claim 2, wherein said receiver is a DAB receiver.

4. The equipment of claim 2, wherein said receiver is an MPEG receiver.

5. The equipment of claim 1, wherein said first apparatus is a television receiver.

6. The equipment of claim 1, wherein said first apparatus is a computer.

7. The equipment of claim 1, wherein said second apparatus is a mobile phone of a digital cellular radio network.

8. The equipment of claim 1, wherein said second apparatus is a digital cordless phone.

9. The equipment of claim 1, wherein said second apparatus is a bidirectional paging device.

10. An apparatus to be used as a first apparatus in multimedia terminal equipment, comprising:

means for receiving audiovisual high-capacity unidirectional multimedia transmissions containing multimedia information from a telecommunications system, and means for presenting said multimedia information to a user, and wherein said multimedia terminal equipment includes:

a second apparatus having a bidirectional communications terminal comprising a wireless communication device for delivering information related to the use of said multimedia information to said telecommunications system, said bidirectional communications terminal transmitting said information related to the use of said multimedia information at a slower transmission rate than the rate of said unidirectional multimedia transmissions, and said first apparatus and said second apparatus are linked by a local wireless communication link and said first apparatus further comprises:

storage means for the temporary storage of received multimedia information; and an agent for controlling dynamic reception and storage of received multimedia information and for controlling the delivering of said information related to the use of multimedia information to said telecommunications system via said second apparatus.

11. The apparatus of claim 10, further comprising an interface for creating a local communications link with a terminal of a bidirectional telecommunications system.

12. The apparatus of claim 10, further comprising a receiver for receiving multimedia information in the form of a broadcast transmission.

13. The apparatus of claim 12, wherein said receiver is a DAB receiver.

14. The apparatus of claim 12, wherein said receiver is an MPEG receiver.

15. The apparatus of claim 10, wherein said first apparatus is a television receiver.

16. The apparatus of claim 10, wherein said first apparatus is a computer.

17. A method for selective reception of multimedia presentations from a telecommunications system and for their presentation to a user, that comprises stages wherein:

audiovisual high-capacity unidirectional multimedia transmissions containing multimedia information relating to multimedia presentations are received with a first apparatus from a telecommunications system and the multimedia information stored locally in the first apparatus, under the control of an agent therein, for use in multimedia presentations to a user with the first apparatus, bidirectional communications deliver via a second apparatus information related to the use of said multimedia information to said telecommunications system at a slower transmission rate than the rate of said unidirectional multimedia transmissions, in response to a user selection of a certain multimedia presentation, it is examined whether the multimedia information required by the user selection and related to the certain multimedia presentation is locally stored in the first apparatus, multimedia information required by the user selection and related to the certain multimedia presentation which is not locally stored is loaded in response to said bidirectional communications, under the control of the agent present in the first apparatus, from the telecommunications system and stored locally in the first apparatus, and multimedia information required by the user selection and related to the certain multimedia presentation is removed from the local storage as it is no more needed in order to present the multimedia presentation to the user.

18. The method of claim 17, further comprising performing a comparison of different channels for loading multimedia information from a telecommunications system and on the basis of the comparison selecting the most advantageous channel for the loading of the multimedia information required by a user selection and related to a certain multimedia presentation.

19. The method of claim 18, wherein at least one of the following criteria is used in said comparison: cost to the user, quality of connection, user's registered rights in various telecommunications systems, user's deliberate choice.

20. The method of claim 17, further comprising collecting information related to the payment arrangement corresponding to the use of the multimedia information and delivering it to said telecommunications system.

21. The equipment of claim 1, wherein said local wireless communication link comprises an infrared link.

22. The equipment of claim 1, wherein said local wireless communication link comprises a low-power radio link.

23. The apparatus of claim 10, wherein said local wireless communication link comprises an infrared link.

24. The apparatus of claim 10, wherein said local wireless communication link comprises a low-power radio link.

25. The method of claim 17, wherein said bidirectional communication is over a wireless communication network.

26. The method of claim 17, wherein said first apparatus and said second apparatus are linked by a local wireless communication link.

27. The method of claim 26, wherein said local wireless communication link comprises an infrared link.

28. The method of claim 26, wherein said local wireless communication link comprises a low-power radio link.

* * * * *